Patented May 13, 1952

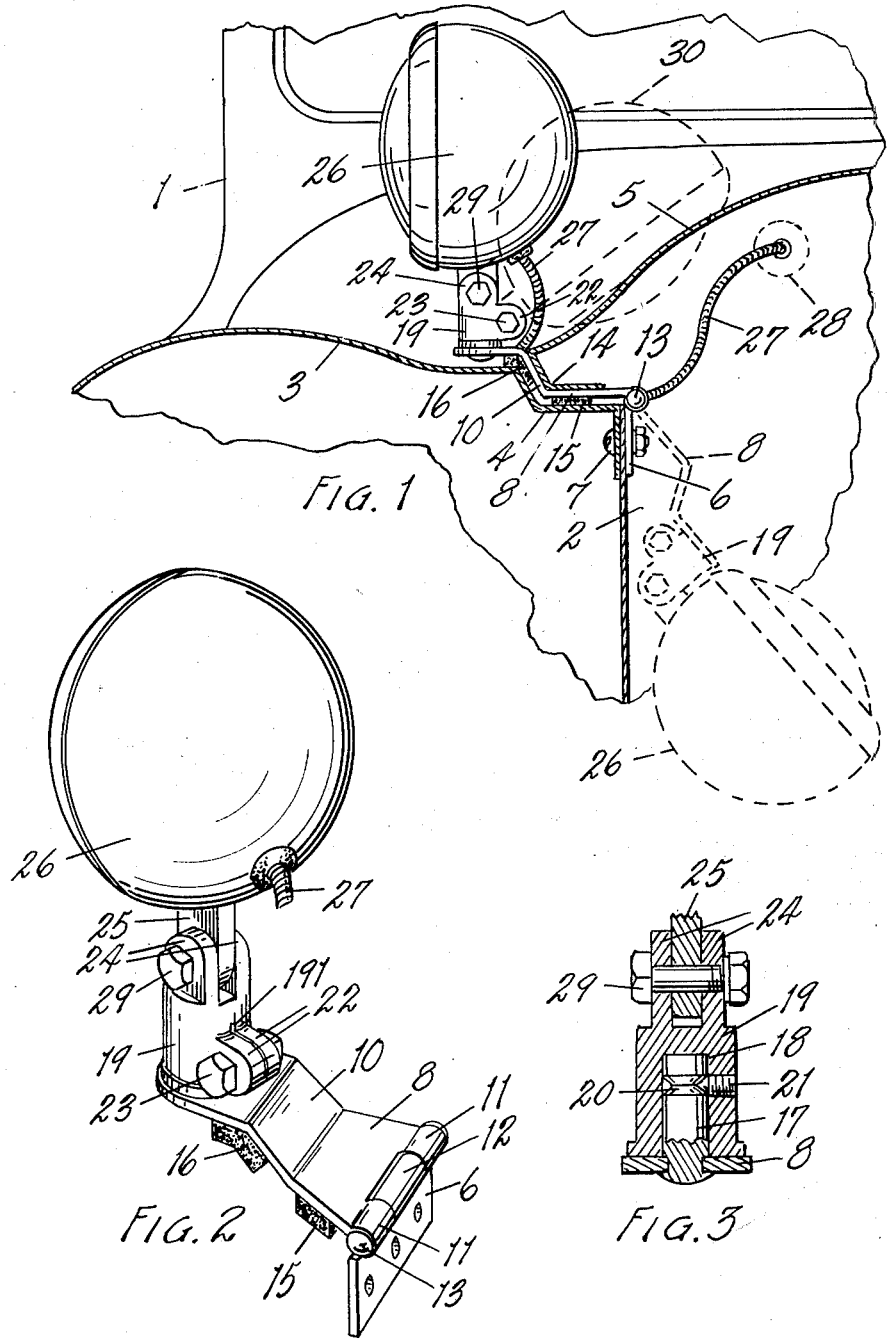

2,596,256

UNITED STATES PATENT OFFICE 2,596,256

SIGNAL LAMP FOR USE ON MOTOR VEHICLES

Elmer C. Laubaugh, Baldwin, Mich.

Application February 20, 1950, Serial No. 145,233

7 Claims. (Cl. 177—329)

This invention relates to improvements in signal lamp for use on motor vehicles.

The principal objects of this invention are:

First, to provide a signal lamp which is well adapted for use on motor vehicles used by law enforcement officers and the like, which is so mounted that it may be adjusted from an erected position for use to a concealed position below the hood of the vehicle.

Second, to provide a structure of this character which can be readily mounted on widely used types of vehicles and quickly and easily adjusted from operative position to concealed position.

Third, to provide a structure having these advantages which is economical in its parts and is very securely supported in an erected position by the hood of the vehicle and without the necessity for special adjusting and clamping means.

Objects relating to details and economies of the invention will appear from the description to follow. The invention is defined and pointed out in the claims.

A preferred embodiment of the invention is illustrated in the accompanying drawing, in which:

Fig. 1 is a fragmentary view partially in section illustrating a practical commercial embodiment of my invention mounted on a motor vehicle and shown in erected position by full lines and in collapsed position by dotted lines, other positions of adjustment being illustrated by dotted lines.

Fig. 2 is a fragmentary perspective view of a structure embodying my invention removed readily for mounting on the vehicle.

Fig. 3 is a fragmentary vertical section through the lamp base and its connection to the supporting bracket.

Various law enforcement officers; for example, traffic officers, highway policemen, conservation officers, have occasion to signal car drivers to a stop. Various means are restorted to for accomplishing this such as horn signalling, which is not very effective, and cutting in before the driver it is desired to question, which is dangerous. Signal lamps have been used, but these are usually positioned so that the general public has become familiar with the fact that the drivers of the vehicles are law enforcement officers and take steps to evade such officers.

With my invention, I provide a mounting for a signal lamp which permits the erection of the lamp to operative position for use or collapsing the lamp beneath the hood for concealment. In the embodiment of my invention illustrated, the numeral 1 designates the body of a motor vehicle which includes an engine compartment 2, a fender 3 having a step 4 therein, providing a seat for the hood 5. The details of these parts are not shown as they form no part of my invention, and the structure illustrated is a commercial type.

The signal lamp of my invention comprises a base plate 6 adapted to be secured to the inner side of the wall 2 at the top thereof as by means of the bolts 7. The lamp supporting bracket 8 is provided with knuckles 11 interlapping with the knuckle 12 on the base plate to receive the pivot 13. The bracket 8 has an upward offset 10 therein to conform the same to the step 4 of the fender and to receive the edge 14 of the hood allowing the hood to close over the same. The bracket is provided with pads 15 and 16 engaging the fender and preventing rattle when the hood is closed, the hood constituting a clamping or hold-down means for the bracket.

The bracket is provided with a post 17 at its outer end engaging the socket 18 in the lamp base 19 (see Fig. 3). The post has an annular groove 20 receiving the retaining screw 21 so that the base may be rotatably adjusted on the post. The base has a vertical split 191 therein and ears 22 on opposite sides of the split receiving the clamping bolt 23 for securing the base in its rotatably adjusted position on the post and relative to the bracket.

The lamp base has a pair of upwardly projecting ears 24 between which the arm 25 of the lamp housing designated generally by the numeral 26 is disposed and to which it is secured in its tiltably adjusted position by the bolt 29. The electrical connection 27 is connected through a switch indicated generally at 28 to the electrical system of the vehicle so that the lamp is in the control of the driver of the vehicle. With this arrangement or mounting of the lamp, it may be swung to erected position as indicated in full lines in Fig. 1 and adjusted as may be desired by the operator, or it may be swung to collapsible position as indicated by dotted lines in Fig. 1 and the hood closed over the same thereby fully concealing the lamp. The dotted lines 30 show an adjustment of the lamp for use in illuminating the parts in the engine compartment, the hood being raised prior to this adjustment. This adjustment may be termed a trouble adjustment. This mounting of the lamp eliminates the necessity of making holes in the fender, which, when the lamp is removed, should be filled in at considerable expense.

I have not attempted to illustrate other embodiments or adaptations, as it is believed that this disclosure will enable those skilled in the art to embody or adapt my invention as may be desired. I have found, however, the embodiment illustrated to be highly practical and desirable.

Having thus described my invention, what I claim as new and desire to secure by Letters Patent is:

1. A signal lamp adapted for use on motor vehicles used by law enforcement officers and the like comprising a base plate adapted to be mounted on the inner side of a side wall of a motor vehicle body adjacent the top thereof and so that the vehicle hood may be closed over the same, a bracket pivotally mounted on the upper edge of said base plate to be swung inwardly within the wall on which the base plate is mounted to permit the hood to close over the same or outwardly above and in supported relation to the adjacent fender, the bracket being provided with an upward offset spaced from its inner end to permit the closing of the hood of the vehicle upon the inner end of the bracket when the bracket is in erected position above the fender with the outer end of the bracket projecting from beneath the hood, said bracket having a post at its outer end, a lamp base provided with a socket engaging said post and having a longitudinal slit therein with ears on opposite sides of the slits, a bolt disposed through said ears for securing said base on said post in a selected rotatably adjusted position thereon, said base being provided with upwardly projecting spaced ears, and a lamp provided with a supporting arm adjustably clamped between said ears whereby the lamp may be secured in a selected position and may be swung to erected position above and supported by the fender of the vehicle or collapsed to a concealed position below the hood.

2. A signal lamp adapted for use on motor vehicles used by law enforcement officers and the like comprising a base plate adapted to be mounted on the inner side of a side wall of a motor vehicle body adjacent the top thereof and so that the vehicle hood may be closed over the same, a bracket pivotally mounted on the upper edge of said base plate to be swung inwardly within the wall on which the base plate is mounted to permit the hood to close over the same or outwardly above and in supported relation to the adjacent fender, said bracket having a post at its outer end, a lamp base rotatably adjustably mounted on said post, and a lamp carried by said lamp base whereby the lamp and bracket may be swung to erected position above and supported by the fender of the vehicle or collapsed to a concealed position below the hood.

3. A signal lamp adapted for use on motor vehicles used by law enforcement officers and the like, comprising a bracket adapted to be swingably mounted on a vehicle body to be swung inwardly to permit the vehicle hood to close over the same or outwardly above and in supported relation to a fender, the bracket being provided with an upward offset spaced from its inner end to permit the closing of the hood of the vehicle upon the inner end of the bracket when the bracket is in erected position above the fender with the outer end of the bracket projecting from beneath the hood, said bracket having a post at its outer end, a lamp base provided with a socket engaging said post and having a longitudinal slit therein with ears on opposite sides of the slit, a bolt disposed through said ears for securing said base on said post in a selected rotatably adjusted position thereon, said base being provided with upwardly projecting spaced ears, and a lamp provided with a supporting arm adjustably clamped between said ears whereby the lamp may be secured in a selected position and may be swung with said bracket to erected position above and supported by the fender of the vehicle or collapsed to a concealed position below the hood.

4. A signal lamp and support adapted to be mounted on a motor vehicle having a hood closable on an adjacent fender, said lamp and support comprising a bracket adapted to be pivotally mounted adjacent the inner side edge of the fender to be swung inwardly below the hood or to be swung outwardly to erected position above the fender, the inner portion of the bracket being conformed to be clamped between the hood and fender in the erected position of the bracket and the closed position of the hood, said lamp being adjustably mounted on the swinging end of said bracket and collapsible with the bracket to a concealed position beneath the hood or to an erected position at the side of the hood.

5. A signal lamp and support adapted to be mounted on a motor vehicle having a hood and a fender, said lamp and support comprising a bracket adapted to be pivotally mounted adjacent the inner side edge of the fender to be swung inwardly below the hood or to be swung outwardly to erected position with the hood closable over the inner portion of the bracket, said lamp being mounted on the swinging end of said bracket to be swung to a concealed position beneath the hood or to an erected position at the side of the hood.

6. A signal lamp and support adapted to be mounted on a motor vehicle having a compartment with a movable exterior closure therefor and an exterior panel located adjacent said compartment, said lamp and support comprising a bracket adapted to be swingably mounted on the vehicle within said compartment and adjacent the outer edge thereof to be swung inwardly below the closure or to be swung outwardly to erected position above the panel and supported thereby with the outer end of the bracket projecting outwardly from the closing edge of said closure, said lamp being adjustably mounted on the swinging end of said bracket, said lamp being collapsible with the bracket to a concealed position beneath the closure or to an exposed erected position.

7. A signal lamp and support adapted to be mounted on a motor vehicle having a compartment with a movable exterior closure therefor and an exterior panel located adjacent said compartment, said lamp and support comprising a bracket adapted to be swingably mounted on the vehicle within said compartment and adjacent the outer edge thereof to be swung inwardly below the closure or to be swung outwardly to erected position with the outer end of the bracket projecting outwardly from the closing edge of said closure, said lamp being adjustably mounted on the swinging end of said bracket, said lamp being collapsible with the bracket to a concealed position beneath the closure or to an exposed erected position.

ELMER C. LAUBAUGH.

REFERENCES CITED

The following references are of record in the file of this patent:

UNITED STATES PATENTS

| Number | Name | Date |
| --- | --- | --- |
| 1,347,011 | Cochran | July 20, 1920 |
| 1,529,366 | Miller | Mar. 10, 1925 |
| 1,684,695 | Draper | Sept. 18, 1928 |
| 2,206,094 | Hobbs | July 2, 1940 |